(12) United States Patent
Jiang et al.

(10) Patent No.: US 12,117,125 B2
(45) Date of Patent: Oct. 15, 2024

(54) HIGH-PRESSURE COMPOSITE CONTAINER

(71) Applicant: YAPP AUTOMOTIVE SYSTEMS CO., LTD, Yangzhou (CN)

(72) Inventors: Lin Jiang, Yangzhou (CN); Dejun Gao, Yangzhou (CN); Hao Lv, Yangzhou (CN); Yiming Weng, Yangzhou (CN); Weidong Su, Yangzhou (CN); Xinlong Liang, Yangzhou (CN); Zhengyun Hu, Yangzhou (CN); Qiang Yang, Yangzhou (CN); Qiang Li, Yangzhou (CN)

(73) Assignee: YAPP AUTOMOTIVE SYSTEMS CO., LTD., Yangzhou (CN)

( * ) Notice: Subject to any disclaimer, the term of this patent is extended or adjusted under 35 U.S.C. 154(b) by 16 days.

(21) Appl. No.: 18/023,740

(22) PCT Filed: Aug. 27, 2021

(86) PCT No.: PCT/CN2021/114879
§ 371 (c)(1),
(2) Date: Feb. 28, 2023

(87) PCT Pub. No.: WO2022/042668
PCT Pub. Date: Mar. 3, 2022

(65) Prior Publication Data
US 2023/0392750 A1 Dec. 7, 2023

(30) Foreign Application Priority Data
Aug. 28, 2020 (CN) .......................... 202010888033.X

(51) Int. Cl.
*F17C 1/16* (2006.01)
*F17C 13/04* (2006.01)
*F17C 13/06* (2006.01)

(52) U.S. Cl.
CPC ............... *F17C 1/16* (2013.01); *F17C 13/04* (2013.01); *F17C 13/06* (2013.01);
(Continued)

(58) Field of Classification Search
CPC .. F17C 1/16; F17C 13/04; F17C 13/06; F17C 2203/0604; F17C 2203/066;
(Continued)

(56) References Cited

U.S. PATENT DOCUMENTS

2014/0299610 A1* 10/2014 Ulekleiv ................ F17C 1/16
220/589
2014/0318691 A1* 10/2014 Olson .................... B29D 22/00
156/187
(Continued)

FOREIGN PATENT DOCUMENTS

CN 1196462 A 10/1998
CN 105135207 A 12/2015
(Continued)

*Primary Examiner* — Shawn M Braden
(74) *Attorney, Agent, or Firm* — Bayramoglu Law Offices LLC

(57) ABSTRACT

A high-pressure composite container is provided. At least a plastic-liner is provided with a plastic shell and a metal end encapsulated by the plastic shell. The plastic-liner of the sealing structure only consists of the plastic shell and the metal end, and the sealing structure is simple. The metal end and a bottle mouth valve jointly compress a sealing ring on the bottle mouth valve, so that the sealing ring forms a stable compression amount, and finally the high-pressure gas cylinder has excellent sealing performance. In addition, the metal end and the plastic shell are well positioned both axially and circumferentially. In the case of high and low pressure and temperature alternation, the relative positions
(Continued)

of the metal end and the plastic shell do not change, and a sealing surface of the plastic shell does not deform and dislocate.

8 Claims, 4 Drawing Sheets

(52) U.S. Cl.
CPC ............... *F17C 2203/0604* (2013.01); *F17C 2203/066* (2013.01); *F17C 2203/0663* (2013.01)

(58) Field of Classification Search
CPC ...... F17C 2203/0663; F17C 2201/0109; F17C 2201/054; F17C 2201/056; F17C 2203/0619; F17C 2203/0673; F17C 2203/0675; F17C 2205/0305; F17C 2221/012; F17C 2221/014; F17C 2221/033; F17C 2223/0123; F17C 2223/036; F17C 2260/036; F17C 2203/0607; F17C 2260/03; F17C 2270/0178; Y02E 60/32

See application file for complete search history.

(56) References Cited

U.S. PATENT DOCUMENTS

| | | | |
|---|---|---|---|
| 2018/0135807 A1* | 5/2018 | Emori | F17C 13/04 |
| 2018/0163927 A1* | 6/2018 | Kanezaki | F17C 13/002 |
| 2018/0172208 A1* | 6/2018 | Lee | F17C 13/00 |

FOREIGN PATENT DOCUMENTS

| | | |
|---|---|---|
| CN | 106838602 A | 6/2017 |
| CN | 206514057 U | 9/2017 |
| CN | 208090298 U | 11/2018 |
| CN | 109027675 A | 12/2018 |
| CN | 208546740 U | 2/2019 |
| CN | 111963890 A | 11/2020 |
| DE | 102016220992 A1 | 4/2018 |
| JP | 2017072264 A | 4/2017 |

* cited by examiner

HIGH-PRESSURE COMPOSITE CONTAINER

CROSS REFERENCE TO THE RELATED APPLICATIONS

This application is the national phase entry of International Application No. PCT/CN2021/114879, filed on Aug. 27, 2021, which is based upon and claims priority to Chinese Patent Application No. 202010888033.X, filed on Aug. 28, 2020, the entire contents of which are incorporated herein by reference.

TECHNICAL FIELD

The present invention belongs to the technical field of high-pressure composite containers, and in particular to a high-pressure composite container with a polymer plastic-liner for containing high-pressure gas.

BACKGROUND

Most taxis are refitted with Compressed Natural Gas (CNG) to replace fuel. Generally, the working pressure of a CNG high-pressure gas cylinder is 20 MPa: some vehicle manufacturers have promoted CNG vehicles or CNG and fuel hybrid vehicles, such as Audi and General Motors Corporation (GM). An automobile with a hydrogen medium battery is also a hot spot at present. The working pressure of the hydrogen storage high-pressure gas cylinder is generally 35 MPa and 70 MPa, and the 70 MPa IV cylinder (the high-pressure plastic-liner composite container) is the current research and development hot spot. In addition to being used by vehicles, the high-pressure gas cylinder is also fully used in other fields. For example, for some liquefied petroleum gas in Europe, the plastic-liner composite container is used (the working pressure is 2 MPa). A large number of high-pressure containers are widely used in daily life. A traditional pure metal or metal-lined composite container has the problem of heavy weight and are difficult to transport. And the higher the storage pressure is, the more complicated the production process of a metal-plastic-liner is, and the higher the cost is, and there is a risk of corrosion by high-pressure gas. In order to meet the requirements of light weight, the high-pressure plastic-liner composite container is produced. Due to the characteristics of plastic, these products have excellent properties such as corrosion resistance, fatigue resistance and light weight. The main manufacturers are Toyota, Hexagon (Norway), Quantum (the United States) and the like. Compared with the pure metal or metal-lined composite container, the sealing performance of the high-pressure plastic-liner composite container is more demanding, mainly because the material of a plastic-liner shell is different from the material of a metal end (since the plastic-liner needs to be in sealed connection with a bottle mouth valve, and the end of the plastic-liner needs to be made of metal), and the connection between the plastic-liner and the metal end may loosen and the sealing performance may decrease during repeated use of the gas cylinder. Therefore, how to make the plastic shell and the metal end form excellent and durable sealing and gas permeability resistance is the core technology of the breakthrough of the high-pressure composite container with the plastic-liner.

In view of the present situation, the connection between the metal end and the plastic-liner has become a hot and difficult research topic. FIG. 1 shows a high-pressure plastic-liner composite container. A metal end 01 is installed on a plastic-liner 02 and then wrapped by a fiber composite material layer 03. FIG. 2 illustrates a sealing structure of an end surface: it is technically infeasible for the metal end 01 to contact a large surface of the plastic-liner, and even if it is feasible, the cost is high. The structure does not consider the axial limit between the metal end 01 and the plastic-liner 02: the structure does not consider the filling pressure in which the internal pressure of the plastic-liner keeps changing during wrapping, which may lead to a gap at the joint between the metal end 01 and the plastic-liner, resulting in leakage: the structure does not consider the limit when a bottle mouth bears the installation torque, resulting in the reduction of the bonding strength between the metal end 01 and the fiber composite material layer 03 after installation. In the structure, an escape path P of the compressed gas is short, which may increase the risk of escape of the compressed gas, especially small-molecule gas CNG, hydrogen, helium and the like.

SUMMARY

The present invention aims to provide a high-pressure composite container, so as to solve the problem that the sealing performance, high and low pressure resistance and temperature alternation performance of an existing plastic shell and metal end are reduced during repeated use of the high-pressure composite container.

The present invention is implemented by the following technical solutions:

A high-pressure composite container, provided with a plastic-liner, the plastic-liner is provided with a plastic shell and a metal end encapsulated by the plastic shell.

The metal end includes two encapsulation parts, which are a first encapsulation part and a second encapsulation part, respectively. The first encapsulation part is arranged at an outer edge part of the metal end, and the second encapsulation part is arranged at a lower part of a bottle mouth valve mounting hole of the metal end. The second encapsulation part is a plurality of parallel grooves arranged along the bottle mouth valve mounting hole of the metal end.

The plastic shell forms a first encapsulation layer on upper and lower surfaces of the first encapsulation part and forms a second encapsulation layer on the inner side of the second encapsulation part, and the first encapsulation layer and the second encapsulation layer are connected through a transition layer.

The first encapsulation layer, the second encapsulation layer and the transition layer form an end part of the plastic shell, and are connected with a body of the plastic shell into an integral structure to form the plastic shell.

Preferably, the first encapsulation part is provided with a first encapsulation hole that runs through from top to bottom. In the encapsulating process, the material of the plastic shell extends in the first encapsulation hole to form a connecting part connecting the upper and lower surfaces of the first encapsulation layer.

Preferably, a second encapsulation hole is formed in a lower end surface on the periphery of the bottle mouth valve mounting hole of the metal end, and the second encapsulation hole is communicated with the groove.

Preferably, the minimum diameter of the second encapsulation part is larger than the diameter of the bottle mouth valve mounting hole of the metal end.

Preferably, two or more sealing surfaces are arranged on the outer surface of the second encapsulation layer, and the two or more sealing surfaces are not in the same plane.

Preferably, the plastic shell selectively adopts a thermoplastic currently used in industry according to the molecular weight permeability characteristics of different high-pressure gases borne, including but not limited to one or more combinations of Polyamide (PA), Polyethylene (PE), Phenyl-propanolamine (PPA), Polyphenylene Sulfite (PPS), polyester, Polypropylene (PP), Polyoxymethylene (POM) or Ethylene vinyl alcohol (EVOH).

Preferably, the plastic shell is made of two or more thermoplastic layers, and a gas barrier layer is arranged between two adjacent thermoplastic layers.

Preferably, a fiber reinforced layer is arranged on the outer surface of the plastic-liner.

Preferably, a bottle mouth valve is arranged in the bottle mouth valve mounting hole of the metal end, and a sealing ring is arranged between the outer side surface of the bottle mouth valve and the second encapsulation layer.

Advantages of the present invention are that:

According to the technical solution, the plastic-liner of the sealing structure only consists of the plastic shell and the metal end, and the sealing structure is simple. The metal end and the bottle mouth valve jointly compress the sealing ring on the bottle mouth valve, so that the sealing ring forms a stable compression amount, and finally the high-pressure composite container has excellent sealing performance. In addition, the metal end and the plastic shell are well positioned both axially and circumferentially. In the case of high and low pressure and temperature alternation, the relative positions of the metal end and the plastic shell do not change, and the sealing surface of the plastic shell does not deform and dislocate, so that the high-pressure composite container finally has excellent resistance to high and low pressure and temperature alternation.

Figure 1:
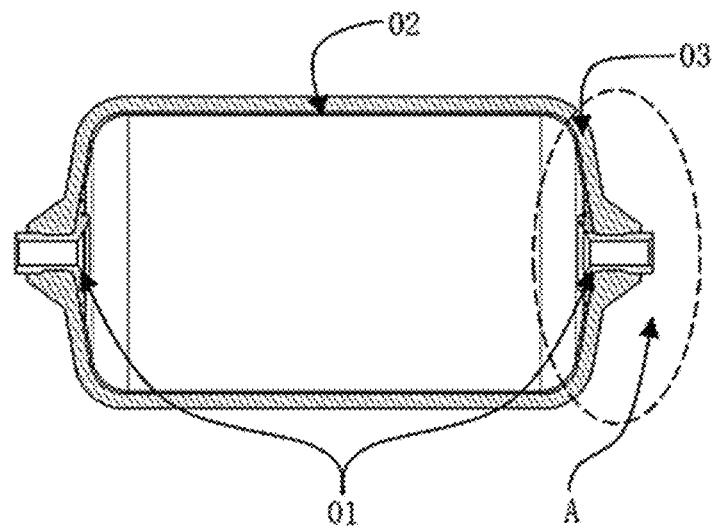
FIG. 1 is a schematic diagram of a high-pressure plastic-liner composite container in a prior art.
Figure 2:
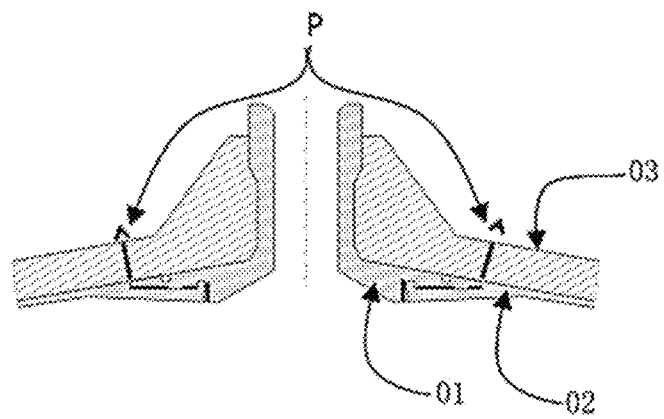
FIG. 2 is an enlarged schematic diagram of a sealing structure at part A in FIG. 1.

BRIEF DESCRIPTION OF REFERENCE NUMERALS OF THE DRAWINGS 01. metal end; 02. plastic-liner; 03. fiber composite material layer; 1. high-pressure composite container; 2. metal end; 21. metal end body; 22. extension part; 23. bottle mouth valve mounting hole; 231. first mounting hole; 232. second mounting hole; 24. first encapsulation part; 25. first encapsulation hole; 26. second encapsulation hole; 27. second encapsulation part; 271. groove; 3. plastic shell; 31. connecting part; 32. first encapsulation layer; 33. second encapsulation layer; 331. first sealing surface; 332. second sealing surface; 333. third sealing surface; 34. transition layer; 4. fiber reinforced layer; 5. bottle mouth valve; 6. sealing ring; 200. metal end; 201. first encapsulation part; 202. second encapsulation part; and 300. plastic shell.

DETAILED DESCRIPTION OF THE EMBODIMENTS

Hereinafter, the technical solution of the present invention will be explained in detail through embodiments. The following embodiments are only exemplary and can only be used to explain and illustrate the technical solution of the present invention, and cannot be interpreted as limitations on the technical solution of the present invention.

Figure 3:
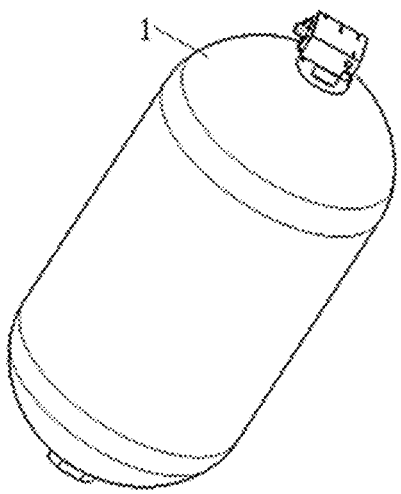
FIG. 3 is a schematic diagram of a high-pressure composite container in the present invention.
Figure 4:
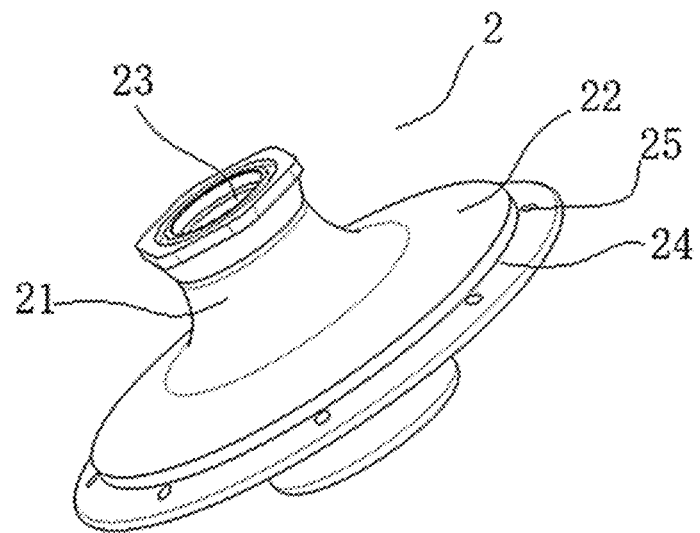
FIG. 4 is a schematic structural diagram of a metal end in the present invention.
Figure 5:
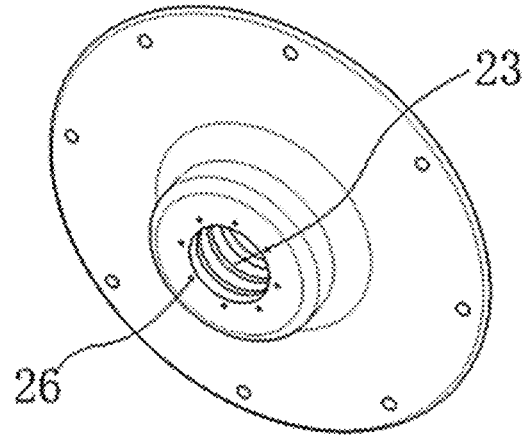
FIG. 5 is a schematic structural diagram of another direction of a metal end in the present invention.
Figure 6:
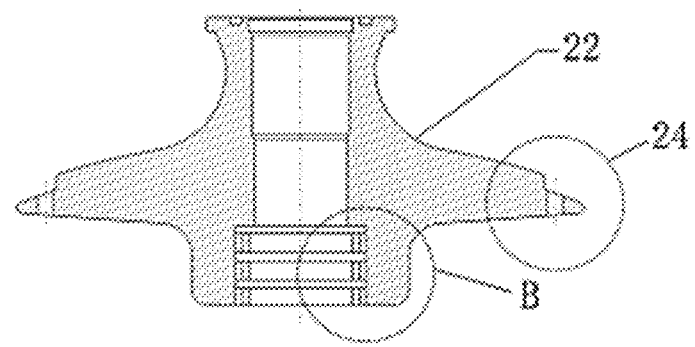
FIG. 6 is an axial sectional view of a metal end in the present invention.
Figure 7:
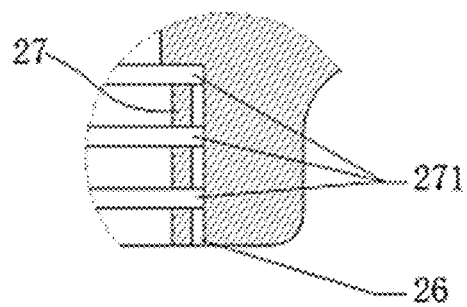
FIG. 7 is an enlarged schematic diagram of part B in FIG. 6.

As shown in FIG. 3, the present application aims to provide a high-pressure composite container 1 for storing a high-pressure gas medium. The high-pressure composite container 1 includes a plastic-liner. The plastic-liner is composed of a plastic shell 3 and a metal end 2 through an encapsulation structure, then a fiber reinforced layer 4 is wrapped around the outer side of the plastic-liner, and a bottle mouth valve 5 provided with a sealing ring 6 with certain system functions is arranged in a bottle mouth valve mounting hole 23 of the metal end.

There is no need to limit the types of gases used for storage in the present application, and all gases that need high-pressure storage may be applied to the high-pressure composite container in the present application, such as hydrogen, CNG, ammonia and nitrogen with pressures greater than 1 MPa, such as 10 MPa, 20 MPa, 30 MPa, 50 MPa, 70 MPa, 80 MPa or higher, provided that the material of the plastic shell and the metal end can reach the corresponding pressure resistance.

In the high-pressure composite container 1 of the technical solution of the present application, it is a conventional technology of the present high-pressure composite container to wrap the fiber reinforced layer on the outer side of the plastic-liner. Here, it is only mentioned that the high-pressure composite container also needs to include the fiber reinforced layer which is wrapped on the outer side of the plastic-liner. Specifically, what kind of fiber is used for the fiber reinforced layer and whether resin matched with the fiber is thermoplastic resin or thermosetting resin may be selected according to the needs of enterprise production, which does not affect the realization of the technical solution of the present application, and the wrapping mode or wrapping method of the fiber reinforced layer is also not illustrated in the present application.

The high-pressure composite container 1 is provided with the bottle mouth valve 5. The structure or function of the bottle mouth valve varies according to the application scenario of the high-pressure composite container, and the corresponding functional system thereof is not within the protection scope of the present application. However, in the technical solution of the present application, the key involves that through the sealing structure technology of the plastic-liner, the bottle mouth valve and the sealing ring thereof are improved to some extent to match the plastic-liner, and the specific improvement will be described later.

The technical solution focuses on the sealing structure of the plastic-liner. It is clear to those skilled in the art that the high-pressure gas stored in the container will not only leak through the valve, but also leak through the container wall and the joint between two parts of the container under high pressure, and the sealing performance of the connecting part will be affected during the change of the pressure of the gas in the container. The technical solution of the present application is just to improve the sealing of the plastic-liner. As shown in FIG. 4 to FIG. 7, a special metal end 2 is used for the plastic-liner in the present application. The metal end 2 in the present application includes a metal end body 21, and a through bottle mouth valve mounting hole 23 is formed in the axial direction of the metal end body. A ring-shaped extension part 22 extends radially from the middle of the outer surface of the metal end body 21, and the thickness of the extension part gradually decreases when the extension part extends outward from the metal end body.

A first encapsulation part 24 which is lower than one circle of the extension part is arranged on the upper surface of the outer edge of the extension part 22. That is, the first encapsulation part is approximately annular. 4-10 first encapsulation holes 25 which run through from top to bottom are formed in the first encapsulation part, and the aperture of the first encapsulation hole is 5-10 mm.

The bottle mouth valve mounting hole 23 includes at least a first mounting hole 231, a second mounting hole 232 and a third mounting hole from top to bottom, and an uppermost guide angle part is not counted here. The second mounting hole has the smallest aperture and the third mounting hole has the largest aperture, and the third mounting hole is the second encapsulation part in the present application. A plurality of parallel grooves 271 are formed in the third mounting hole, and in the embodiment, three grooves are formed.

4-10 axial second encapsulation holes 26 are formed around the bottle mouth valve mounting hole, and each second encapsulation hole 26 is communicated with the groove 271.

According to the resistance to corrosion of different gas media borne and high pressure resistance, the metal end is preferably made of metal, such as aluminum alloy, stainless steel and other metal materials that meet the hydrogen corrosion resistance.

Figure 8:
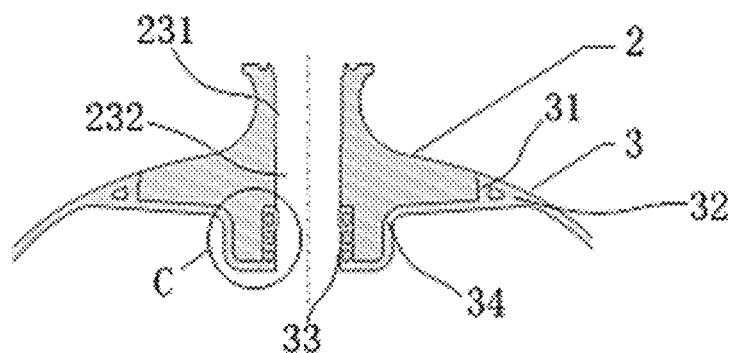
FIG. 8 is a schematic structural diagram of encapsulation of a metal end region.
Figure 9:
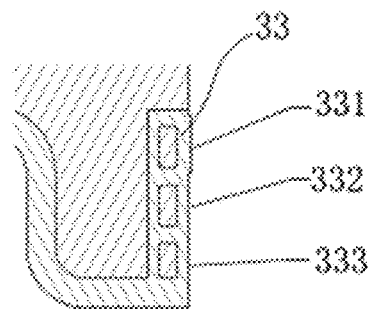
FIG. 9 is an enlarged schematic diagram of part C in FIG. 8.

As shown in FIG. 8 and FIG. 9, the plastic shell 3 and the metal end 2 are bonded by encapsulation to form the plastic-liner. Specifically, the metal end is used as an insert. In the injection molding process, the plastic material is fully encapsulated in the first encapsulation part 24 and the second encapsulation part 27 of the metal end through the injection-molded encapsulated plastic shell.

In the present application, according to the molecular weight permeability characteristics of different high-pressure gases borne, the thermoplastic currently used in industry, such as PA, PE, PPA, PPS, polyester, PP, POM and EVOH is selectively employed, and the plastic shell may also be made of a multi-layer thermoplastic material of the above materials, and a gas barrier layer is arranged between two adjacent thermoplastic material layers to prevent small gas molecules borne such as hydrogen molecules from penetrating from the material.

The plastic shell 2 forms a first encapsulation layer 32 on upper and lower surfaces of the first encapsulation part 24 and forms a second encapsulation layer 33 on the inner side of the second encapsulation part 27, and the first encapsulation layer 32 and the second encapsulation layer 33 are connected through a transition layer 34.

The first encapsulation layer 32, the second encapsulation layer 33 and the transition layer 34 form an end part of the plastic shell, and are connected with a body of the plastic shell into an integral structure to form the plastic shell.

In the encapsulating process, the material of the plastic shell extends in the first encapsulation hole to form a connecting part 31 connecting the upper and lower surfaces of the first encapsulation layer. The material of the plastic shell extends in the second encapsulation hole, and is meanwhile encapsulated in the groove of the second encapsulation part and connected with the material of the plastic shell in the second encapsulation hole into an integral structure, forming a locking structure with the metal end, so as to avoid the rotation or axial displacement between the metal end and the plastic shell, which leads to the sealing failure of a sealing part.

Figure 12:
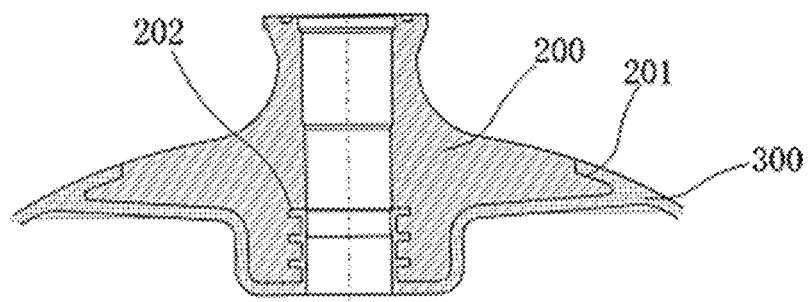
FIG. 12 is a schematic diagram of encapsulation of another metal end structure in the present invention.

In other embodiments of the present application, the metal end 200 includes a first encapsulation part 201 and a second encapsulation part 202. The first encapsulation hole is not formed in the first encapsulation part, and the second encapsulation hole is not formed in the second encapsulation part. The plastic shell 300 directly encapsulates the metal end, and the final encapsulated structure is shown in FIG. 12.

In the plastic shell material of the present application, three sealing surfaces, namely a first sealing surface 331, a second sealing surface 332 and a third sealing surface 333, are formed on the outer surface of the second encapsulation part from top to bottom, and the three sealing surfaces are not on the same plane. In other embodiments of the present application, the specific number of sealing surfaces depends on the specific manufacturing process and the requirements of the actual sealing part of a product.

Figure 10:
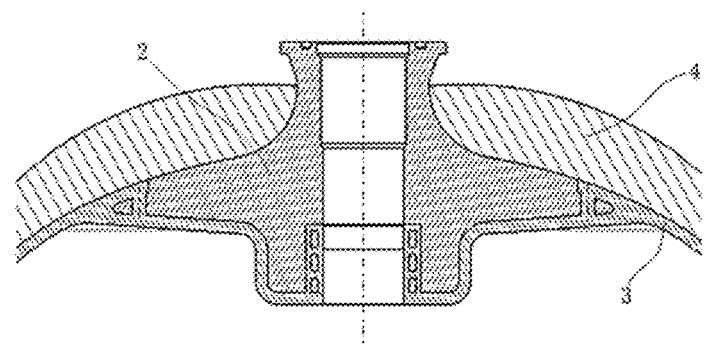
FIG. 10 is a schematic structural diagram of a fiber reinforced layer wrapped around the outer side of a plastic-liner.

As shown in FIG. 10, the fiber reinforced layer 4 is wrapped around the plastic-liner to reinforce the high-pressure composite container and resist the pressure of the internal high-pressure gas.

Figure 11:
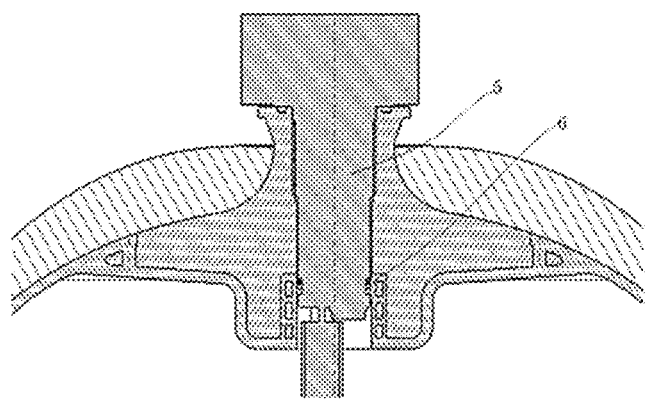
FIG. 11 is a schematic structural diagram of a bottle mouth valve equipped with a sealing ring.

As shown in FIG. 11, in order to assemble a bottle mouth valve 5 with a sealing ring 6, in the technical solution, the bottle mouth valve is directly sealed with the plastic shell through the sealing ring, and the sealing ring is compressed to some extent, thus avoiding the problem that a traditional plastic-liner structure is sealed by the metal end and the plastic shell first, and then sealed by the bottle mouth valve and the metal end for twice sealing, resulting in poor sealing performance.

The preferred material for the sealing ring is Fluororubber (FKM), Ethylene-Propylene-Diene Monomer (EPDM), Fluorosilicone elastomer (FVWQ), Polytetrafluoroethylene (PTFE), silicone, etc. For the hydrogen corrosion resistance and low temperature resistance, FKM, EPDM, PTFE, etc. are preferred.

The plastic shell 3 forms three sealing surfaces on the second encapsulation layer, which may meet the sealing requirements with two sealing rings at different positions in the axial direction of the bottle mouth valve, so that the sealing performance is more excellent, may meet the sealing requirements of a sealing plug and the like during the process sealing detection of the high-pressure composite container, and may avoid the problem that the sealing surface is damaged at the sealing position during the process detection, and then the sealing surface is subsequently provided for the bottle mouth valve to seal, resulting in attenuation of the sealing performance of the final product.

The plastic-liner of the sealing structure only consists of the plastic shell and the metal end, and the sealing structure is simple. The metal end and the bottle mouth valve jointly compress the sealing ring on the bottle mouth valve, so that the sealing ring forms a stable compression amount, and finally the high-pressure composite container has excellent sealing performance. In addition, the metal end and the plastic shell are well positioned both axially and circumferentially. In the case of high and low pressure and temperature alternation, the relative positions of the metal end and the plastic shell do not change, and the sealing surface of the plastic shell does not deform and dislocate, so that the high-pressure composite container finally has excellent resistance to high and low pressure and temperature alternation.

Finally, in the process of using the high-pressure composite container, the leakage of the high-pressure gas medium borne is prevented, the use safety of the high-pressure container is ensured, the energy is saved, and the environment is protected. In addition, the excellent fatigue resistance prolongs the service life of the high-pressure composite container. The above is only a specific implementation of the present invention, but the scope of protection of the present invention is not limited thereto. Any change or replacement without creative work should be included in the scope of protection of the present invention. Therefore, the scope of protection of the present invention should be subject to the scope of protection defined by the claims.

What is claimed is:

1. A high-pressure composite container, comprising a plastic-liner, wherein the plastic-liner is provided with a plastic shell and a metal end encapsulated by the plastic shell,
    wherein the metal end comprises two encapsulation parts, the two encapsulation parts are a first encapsulation part and a second encapsulation part, respectively, wherein
    the first encapsulation part is arranged at an outer edge part of the metal end, and the second encapsulation part is arranged at a lower part of a bottle mouth valve mounting hole of the metal end, wherein the second encapsulation part is a plurality of parallel grooves, the plurality of parallel grooves is arranged along the bottle mouth valve mounting hole of the metal end;
    the plastic shell forms a first encapsulation layer on upper and lower surfaces of the first encapsulation part and forms a second encapsulation layer on an inner side of the second encapsulation part, and the first encapsulation layer and the second encapsulation layer are connected through a transition layer;
    the first encapsulation layer, the second encapsulation layer and the transition layer form an end part of the plastic shell, and are connected with a body of the plastic shell into an integral structure to form the plastic shell; and
    a second encapsulation hole is formed in a lower end surface on a periphery of the bottle mouth valve mounting hole of the metal end, and the second encapsulation hole is communicated with the groove.

2. The high-pressure composite container according to claim 1, wherein the first encapsulation part is provided with a first encapsulation hole, wherein the first encapsulation hole runs through from a top to a bottom, and in an encapsulating process, a material of the plastic shell extends in the first encapsulation hole to form a connecting part, wherein the connecting part connects upper and lower surfaces of the first encapsulation layer.

3. The high-pressure composite container according to claim 1, wherein a minimum diameter of the second encapsulation part is larger than a diameter of the bottle mouth valve mounting hole of the metal end.

4. The high-pressure composite container according to claim 1, wherein at least two sealing surfaces are arranged on an outer surface of the second encapsulation layer, and the at least two sealing surfaces are not in the same plane.

5. The high-pressure composite container according to claim 1, wherein the plastic shell selectively adopts a thermoplastic according to a molecular weight permeability characteristics of different high-pressure gases borne, wherein the thermoplastic comprises at least one combinations selected from the group consisting of Polyamide (PA), Polyethylene (PE), Phenyl-propanolamine (PPA), Polyphenylene Sulfite (PPS), polyester, Polypropylene (PP), Polyoxymethylene (POM), and Ethylene vinyl alcohol (EVOH).

6. The high-pressure composite container according to claim 5, wherein the plastic shell is made of at least two thermoplastic layers, and a gas barrier layer is arranged between two adjacent thermoplastic layers.

7. The high-pressure composite container according to claim 1, wherein a fiber reinforced layer is arranged on an outer surface of the plastic-liner.

8. The high-pressure composite container according to claim 1, wherein a bottle mouth valve is arranged in the bottle mouth valve mounting hole of the metal end, and a sealing ring is arranged between an outer side surface of the bottle mouth valve and the second encapsulation layer.

* * * * *